Patented Jan. 11, 1949

2,458,520

UNITED STATES PATENT OFFICE 2,458,520

ACYLATION OF THIOPHENE

Alvin I. Kosak, Columbus, Ohio, and Howard D. Hartough, Pitman, N. J., assignors to Socony-Vacuum Oil Company, Incorporated, a corporation of New York No Drawing. Application November 8, 1945, Serial No. 627,530

20 Claims. (Cl. 260—329)

This invention relates to a process for the acylation of thiophene and more particularly is directed to a method for acylating thiophene and its derivatives in the presence of an acidic catalyst comprising a sulfur, phosphorus or fluorine-containing hydroxy acid.

Acylation reactions are well known in the art and connote the union between acyl radicals and molecules of organic compounds under conditions of temperature, pressure and time ordinarily referred to in the art as acylating conditions. The compounds thus produced represent structurally the addition of the original acyl radical to the organic compound molecule with the elimination of a hydrogen atom.

As a general rule, the temperature, pressure and time of reaction employed in acylation operations depend upon whether the acylation is effected in the absence or presence of acylation catalysts. The two methods are generally referred to as thermal and catalytic acylation respectively. The majority of acylation processes fall under the latter category and it is a catalytic acylation process with which the present invention is concerned.

The acyl radicals may be furnished in acylation reactions by various materials commonly referred to as acylating agents. Thus, anhydrides of carboxylic acids, acyl halides and acyl nitriles have served as sources of the acyl radical. In particular, acetic anhydride and acetyl chloride have found wide application in acylation operations.

The acylation of thiophene and thiophene derivatives has previously been carried out employing one of the above-mentioned acylating agents in the presence of various catalysts including aluminum chloride, stannic chloride, titanium tetrachloride, phosphorus pentoxide and 2-chloromercurithiophene.

Of these processes the catalytic methods employing Friedel-Crafts type catalyst such as aluminum chloride, stannic chloride, titanium tetrachloride and the like have been used most extensively. These catalysts, although applicable with considerable success in the acylation of aromatic hydrocarbons, are only moderately successful where thiophene is involved. This appears to be due to the relative instability of the thiophene ring, the Friedel-Crafts catalyst, for example aluminum chloride, attacking the sulfur atom of the thiophene ring and causing many undesirable secondary reactions with resulting low yields of acyl thiophenes. Furthermore, compounds such as aluminum chloride form addition complexes with the carbonyl group of the resulting ketone substantially decreasing the yield of desired product and requiring a considerable excess of aluminum chloride over the theoretical amount required for the acylation process. Thus, when aluminum chloride is used as the condensing agent the mol ratio of catalyst to acyl chloride or acyl nitrile is at least one, and in the case of acid anhydrides at least two. Likewise, other Friedel-Crafts catalyst such as stannic chloride must be used in molecular quantities with respect to the acyl halide being employed in the acylation of thiophene. This is probably due to the fact that acyl halides form comparatively stable molecular complexes with aluminum chloride and stannic chloride thereby decreasing their catalytic effect.

The acylation of thiophene has accordingly been an exceedingly difficult reaction to carry out with good yields of desired product. The usual acylation catalysts, moreover, cause excessive resinification of the thiophene reactant. The resinification usually occurs before acylation can be effected and if the expected reaction product is formed it is generally only in very small amounts.

It has now been discovered that acylated thiophenes may be obtained in an efficient manner by reacting thiophene or thiophene derivatives with acylating agents in the presence of a catalyst comprising a strong hydroxy acid containing phosphorus, sulfur or fluorine.

It has been found that by using an acylating catalyst comprising a hydroxy acid of one or more of these elements the above mentioned difficulties encountered in the acylation of thiophene have largely been overcome. It would appear that the advantages obtained using a strong hydroxy acid can be attributed at least in part to the fact that relatively small quantities of acid can be used as effective catalysts in the acylation of thiophene. Hence, in addition to providing a higher yield of desired product, the present process affords a more economical and efficient catalyst for the acylation of thiophene than has been used heretofore. Thus, in accordance with the process of the present invention a catalyst comprising a strong hydroxy acid of sulfur, phosphorus, or fluorine produces a product consisting almost entirely of acyl thiophenes having one or more side chains corresponding to that of the acylating agent, and being relatively free of polymerized or decomposed side products.

It is, accordingly, an object of the present invention to provide an efficient process for synthesizing acylated thiophenes. A more specific object is to afford a process for catalytically acylating thiophene and its derivatives. A very important object is to afford a process capable of reacting thiophene or its derivatives with an acylating agent in the presence of relatively small quantities of an inexpensive catalyst without undue formation of addition complexes between the catalyst and thiophene or between the catalyst and acylating agent.

These and other objects which will be recognized by those skilled in the art are attained in accordance with the present invention, wherein thiophene or its derivatives are acylated by reaction with organic carboxylic acid anhydrides or acyl halides in the presence of a strong hydroxy acid containing sulfur, phosphorus or fluorine.

The catalysts in question are strong acids containing at least one hydroxy group in the molecule such as phosphoric acid and sulfuric acid. While the mechanism of the acylation reaction is not definitely known, it has been noted that strong acids, such as hydrochloric acid, which do not contain hydroxy groups are ineffective as catalysts. Likewise, weak acids containing hydroxy groups such as boric acid fail to catalytically promote the acylation of thiophene. Representative of the acidic catalysts contemplated for use in this invention, are the hydroxy acids of sulfur and phosphorus and the fluorine containing acids which have one or more hydroxy groups such as the fluophosphoric and the hydroxy fluoboric acids. In general, acids of the above type, having an ionization constant greater than $1.0 \times 10^{-2}$ for the first hydrogen atom, are employed as catalysts in the process of this invention.

The acylating agents to be used may be a carboxylic acid anhydride or an acyl halide. These may be derived by methods well known to the art from organic acids which may be either unsaturated or saturated. Thus, representative acylating agents to be used in this invention include the anhydrides of saturated fatty acids such as acetic anhydride, propionic anhydride, etc.; the acyl halides of saturated fatty acids such as acetyl chloride, etc.; the anhydrides of unsaturated acids such as crotonic anhydride; the acyl halides of unsaturated acids such as crotonyl chloride; the anhydrides of dibasic acids such as adipic anhydride; and the acyl halides of dibasic acids such as adipyl chloride. These acylating agents are given merely by way of examples and are not to be construed as limiting since other acyl halides or anhydrides of carboxylic acids which will readily suggest themselves to those skilled in the art may likewise be used. It is to be noted that acyl nitriles and carboxylic acids, which have been employed in some acylation reactions, fail to acylate thiophene under the conditions of the present process and hence are not included herein as acylating agents.

Thiophene or its derivatives may be acylated in accordance with this invention. The 2- and 5-positions on the thiophene ring being adjacent to the sulfur are much more reactive than the 3- and 4-positions and in acylating thiophene the entering acyl group will preferably attach itself to the carbon atom adjacent to the sulfur. When the 2-position is occupied, the acyl substituent enters almost entirely in the 5-position. When a substituent occupies the 3-position, the acyl substituent will enter for the most part at the 2-position, if the hindrance is not too great. In some instances a small portion of the 3- and 5-product may be obtained. Representative of the thiophene derivatives which may be acylated in accordance with the process disclosed herein include the halogen, alkyl, aryl, and alkoxy derivatives. These derivatives together with thiophene will hereinafter be referred to as thiophenes.

The process may be carried out employing equimolar quantities of thiophene and acylating agents and in some instances a yield resulted as high as that obtained when a molar excess of one of the starting materials was used. However, an excess of one of the reactants appears to be desirable. Experiments identical in all respects, except in reactant ratio, showed that an acetic anhydride-thiophene ratio of 2:1 resulted in appreciably higher conversions to ketone than the amount obtained when equimolar quantities were used. Similarly, an excess of thiophene also raises the yield. As is to be expected, the rate of reaction is more rapid when an excess of one of the starting materials is present.

The reaction rate is largely a function of the temperature, increasing with increasing temperatures, the upper limit of temperature being dependent on the boiling point of the reactants at the specific pressure of the reaction. In general, temperatures varying from about $-30°$ C. to about $150°$ C. and pressures varying between atmospheric and about 6 atmospheres have been found satisfactory for effecting the acylation reaction. The effect of increased pressure, theoretically, is toward increased reaction, but from a practical standpoint, this is not a very great effect with reactions such as those involved herein which go readily at normal pressure. The temperature to be employed will depend on the time of reaction and the nature of the acylating agent used. Ordinarily, a pressure sufficient to maintain the reactants in the liquid phase is used and this is more or less dependent upon the particular temperature involved. As a general rule, the higher the temperature the higher the pressure and the lower the reaction time needed. It is, of course, to be understood that these reaction variables are more or less interdependent.

Under the conditions encountered in the process of this invention, however, the reaction period will generally vary from about 1 to about 10 hours. Considerably shortened reaction times are to be avoided since, as ordinarily carried out, the acylation process was found to be incomplete when the reaction period was substantially less than one hour.

The strong hydroxy acids containing sulfur, phosphorus, or fluorine employed herein as catalysts may be either organic or inorganic acids containing one or more of these elements. The inorganic acids, however, generally having higher dissociation constants and being more readily obtainable will usually be used. The sulfur, phosphorus, or fluorine containing acids having one or more hydroxy groups present may be employed in amounts as little as 0.1 per cent by weight of the reactants. However, amounts varying between about 1 and about 8 per cent by weight are preferable. Representative acids contemplated for use herein as catalysts include strong hydroxy acids of phosphorus such as phosphoric and phosphorus acids; strong hydroxy acids of sulfur such as sulfuric and the sulfonic acids, including the toluene sulfonic acids; strong hydroxy acids containing fluorine such as fluosulfonic acid, dihydroxy-fluoboric acid and fluophosphoric acid. Other hydroxy acids of fluorine, sulfur or phosphorus having relatively high dissociation constants, that is generally greater than $1.0 \times 10^{-2}$ for the first hydrogen atom are likewise contemplated for use as catalysts in the acylation of thiophene and its derivatives. Hence the above representative list of suitable catalysts is not to be considered as limiting.

Phosphoric acid in a concentration of 85% has been found to give, with equimolecular portions of thiophene and acetic anhydride, a 65% yield of ketone when used in quantities of 2.6% of aqueous acid by weight of the starting materials. Increasing the acid to 5.2% did not augment the yield while decreasing the percentage by weight to 1.05% lowered the yield to 55.5% and 0.67% of catalyst gave a 19.4% conversion to ketone. Utilization of a two-fold excess of either thiophene or acetic anhydride using amounts of about 2.5% by weight of phosphoric acid resulted in approximately 79% yield of ketone. When phosphoric acid is employed as the catalyst it is possible to recover more than 90 per cent of the unreacted thiophene since there is little destructive reaction by the phosphoric acid. When sulfuric acid is used it is desirable to employ temperatures below the boiling point, that is on the order of 35–75° C. It is also important, when using sulfuric acid, to avoid lengthy reaction times since this acid has a more destructive action on the thiophene nucleus than does phosphoric acid. Use of more dilute solutions of sulfuric acid of the order of 85% concentration diminishes the destructive reaction of the catalyst somewhat and gives slightly better yields under similar conditions than the more concentrated acid of about 96% concentration. Fluophosphoric acid monohydrate has been found to be a a highly efficient catalyst for the acylation of thiophene, the yield of ketone in the reaction between equimolecular quantities of thiophene and acetic anhydride being of the order of 80%. Furthermore, there is little sludge formation when this catalyst is used.

An essential feature of the catalyst of the present invention is that it be a strong hydroxy containing acid of phosphorus, sulfur or fluorine. Strong hydroxy acids not containing one of these elements, such as picric acid, and weak hydroxy acids, such as boric acid, did not exhibit any catalytic activity as acylation catalysts. Likewise, strong inorganic acids which do not contain hydroxy groups, such as hydrochloric, hydrofluoric and hydrobromic acids, were also devoid of any catalytic effect. The chemistry of thiophene in many respects is similar to that of benzene. However, it is to be noted that the catalysts of the present invention are inoperative as catalysts for the acylation of benzene.

The process of this invention accordingly comprises mixing thiophene or thiophene derivative, acylating agent, and a catalyst comprising a strong hydroxy acid of phosphorus, sulfur, or fluorine, heating the resulting mixture at a suitable temperature for a sufficient period of time to effect the acylation of thiophene or thiophene derivative, neutralizing the acidic product with an alkaline solution such as aqueous sodium carbonate or hydroxide, water washing and distilling to give the desired acylated thiophene. The catalyst will preferably be added to the mixture of reactants in substantially pure form or as highly concentrated aqueous solutions. The use of more dilute solutions, in general, requires a greater addition of acid. The concentration and volume of acid employed should preferably be such that the acid is present in the reaction mixture in amounts of from about 1 to about 8 per cent by weight of the reactants.

It has been further found, as will be shown hereinafter, that the method of addition of the catalyst to the reaction mixture directly affects the yield of acylated thiophene. The catalyst should preferably be added either to a mixture of thiophene and acylating agent or directly to the thiophene followed by subsequent addition of the acylating agent. The addition of catalyst to the acylating agent directly should be avoided since it has been found that prolonged contact time with the acylating agent destroys its catalytic effect. This may be due to ester formation between the acid and the acylating agent employed, tending to neutralize the catalytic effect of the catalyst. This postulation finds support in the fact that esters of the acids employed as catalysts, herein fail to catalyze the reaction. For example dimethylsulfate was found to be inert as a catalyst for the acylation of thiophene. In general, addition of the catalyst to a hot solution of acylating agent and thiophene was found to give a greater yield of ketone than when the addition was made at room temperatures.

Acylated thiophenes produced in accordance with this invention are useful as solvents, dye intermediates, addition compounds for petroleum fractions, plasticizers, odorants, perfume diluents, resin intermediates and intermediates for chemical synthesis. Long chain alkyl thienyl ketones may also find uses as synthetic lubricants, waxes, extreme pressure additives for mineral oils and anti-forming agents.

The following detailed examples are for the purpose of illustrating modes of effecting the acylation of thiophenes in accordance with the process of this invention. It is to be clearly understood that this invention is not to be considered as limited to the specific acylating agents disclosed hereinafter or to the manipulations and conditions set forth in the examples.

*Example 1*

One mol of thiophene, one mol of 95% acetic anhydride and 10 grams of 85% phosphoric acid were introduced into a reaction vessel and refluxed for a period of 4 hours at temperatures varying from 100–112° C. The resulting product was then cooled, water washed, neutralized with a dilute sodium carbonate solution, again water washed and dried. This material was then distilled through a fractionating column, the ketone fraction being collected under reduced pressure. A 65.1% yield of 2-acetylthiophene was obtained having a boiling point of 213° C. at 760 mm. pressure.

*Example 2*

To 168 grams (2 mols) of thiophene was added 141 grams (1 mol) of benzoyl chloride and 10 grams of 85% phosphoric acid. This material was heated to reflux over a period of 60 minutes and then held at reflux for 5 hours. The material was then cooled and poured into a 20% aqueous solution containing 1.5 mols of sodium hydroxide. After the excess benzoyl chloride had been neutralized the excess thiophene was removed from the product by distillation whereby 168 grams of dark brown product 2-benzothienone was obtained. This represents a yield of 84% of theory. The crude product was purified by distillation followed by recrystallization from petroleum ether containing just enough alcohol to form a clear solution. The rod-like crystals of 2-benzothienone obtained had a melting point of 56.5–57° C.

The above example repeated in the absence of a phosphoric acid catalyst gave a yield of 12 grams of crude 2-benzothienone. This represents a yield of 6.4% of the theoretical as compared with a value of 84% when phosphoric acid catalyst was employed.

*Example 3*

To 84 grams (1 mol) of thiophene was added 50 grams (0.27 mol) of adipyl chloride and 3 grams of 85% phosphoric acid. The reaction was run exactly as in Example 2. 20 grams of dark brown crystalline material 5-(2-thenoyl) pentanoic acid was obtained. This represents a yield of 36% of the theoretical. Purification was accomplished by dissolving the material in alcohol and treating with decolorizing charcoal. The charcoal was removed by filtration and evaporation of the alcohol gave yellow crystals which were still quite impure. These crystals were taken up in ethyl acetate and were precipitated by the addition of petroleum ether to produce a light yellow crystalline product at a melting point of 79–80° C. This purified 5-(2-thenoyl) pentanoic acid gave a light yellow semicarbazone having a melting point of 200–201° C.

*Example 4*

Eighty-four grams of thiophene, 110 grams of acetic anhydride and 4 grams of para toluenesulfonic acid monohydrate were introduced into a reaction vessel and refluxed for a period of 4 hours at temperatures varying from 100 to 125° C. The resulting product was then cooled, water washed, neutralized with dilute sodium carbonate solution, again water washed and dried. The resulting product was then distilled and the ketone fraction collected under reduced pressure to give 78 grams of 2-acetyl thiophene which represented a yield of 62% of the theoretical. No thiophene tars were encountered during the reaction and unreacted thiophene could readily be recovered from the reaction mixture.

*Example 5*

One and one-half mols of thiophene, one mole of acetyl chloride and five grams of 85% phosphoric acid were introduced into a reaction vessel. The mixture was heated slowly to avoid too voluminous an evolution of hydrogen chloride and a consequent entrainment of reactants and maintained at a temperature of 40 to 65° C. for a period of four hours. At the end of this period, the reaction product was cooled, water washed and neutralized with sodium carbonate solution, again water washed and dried over activated alumina. The dried product was then distilled and the ketone fraction collected under a reduced pressure to give a yield of 33.3% of 2-acetyl-thiophene.

*Example 6*

To 420 grams (5 mols) of thiophene and 786 grams (6 moles) of propionic anhydride was added 25 grams of 85% $H_3PO_4$ and the reaction mixture heated to a reflux temperature of 110–145° C. over a period of 2 hours, 1200 cc. of water was added to the cooled mixture to decompose excess anhydride, the water layer was removed, and the organic layer washed with sodium carbonate solution until neutral. Distillation yielded 535 grams of product boiling at 80–85° C. at 3 mm. pressure. This represents a conversion of 76% to the 2-propionylthiophene. About 18 grams of 2,5-dipropionylthiophene having a boiling point of 140–150° C. at 3 mm. pressure was obtained by further distillation.

The following examples illustrate the affect which the method of catalyst addition has upon the yield of desired product.

*Example 7*

A 20% phosphoric acid solution in acetic anhydride was prepared by dissolving 23.5 grams of 85% $H_3PO_4$ in 76.5 grams of acetic anhydride. A heat of solution was noted.

To 252 grams (3 moles) of thiophene and 107 grams (1 mole) of 97.5% acetic anhydride was added 9 grams of the 20% $H_3PO_4$ solution. The reaction mixture was refluxed at 90° C. for 2 hours. No acetyl thiophene could be obtained from the reaction mixture.

*Example 8*

To the same reaction mixture described in Example 7 was added 2 grams of 85% $H_3PO_4$ (calculated amount added in 20% solution above). After two hours refluxing at 90° C., 51 grams of 2-acetylthiophene could be isolated. This represents a 40.5% conversion to the ketone.

*Example 9*

To the 252 grams of thiophene was added the 2 grams of $H_3PO_4$ and then the acetic anhydride added slowly. After 2 hours refluxing 69 grams of 2-acetylthiophene could be isolated. This represents a conversion of 55% to the ketone.

*Example 10*

The same reaction proportions of thiophene and acetic anhydride were employed as in Example 7 and these were heated to 80° C. and 2 grams of 85% $H_3PO_4$ was added. A heat of reaction was noted. After 2 hours of refluxing 93 grams of 2-acetylthiophene could be isolated. This represents a conversion of 74% to the ketone.

Other representative examples which were carried out in a manner similar to that of Example 1 are given in the following table showing the relative amounts of thiophene, acetic anhydride and catalyst employed, the time and temperature of the reaction and the resulting yield of 2-acetylthiophene.

| Example No. | Catalyst | Grams of Catalyst | Percent by Weight of Catalyst | Mols of Thiophene | Mols of 95% Acetic Anhydride | Reaction Time in Hours | Reaction Temperature, °C. | Percent Yield of Ketone |
|---|---|---|---|---|---|---|---|---|
| 11 | 85% Phosphoric Acid | 5 | 2.61 | 1 | 1 | 1 | 97–113 | 65.5 |
| 12 | do | 2 | 1.05 | 1 | 1 | 4 | 94–109 | 55.5 |
| 13 | do | 0.85 | 0.67 | 1 | 1 | 2 | 94–102 | 19.4 |
| 14 | do | 7 | 2.55 | 2 | 1 | 2 | 96–99 | 79.4 |
| 15 | do | 7 | 2.35 | 1 | 2 | 2 | 135–136 | 79.4 |
| 16 | do | 3 | 1.57 | 1 | 1 | 4 | 50 | 24.2 |
| 17 | 85% Sulfuric Acid | 5 | 2.61 | 1 | 1 | 3 | 120–127 | 46.0 |
| 18 | 96% Sulfuric Acid | 4 | 2.68 | 0.5 | 1 | 3 | 122–127 | 42.9 |
| 19 | do | 5 | 2.61 | 1 | 1 | 4 | 55 | 53.6 |
| 20 | Fluophosphoric Acid Monohydrate | 10 | 5.24 | 1 | 1 | 3 | 95–115 | 80.6 |
| 21 | do | 3 | 1.29 | 1.5 | 1 | 2 | 93–104 | 71.4 |
| 22 | Dihydroxyfluoboric Acid | 10 | 5.24 | 1 | 1 | 2 | 110–116 | 51.2 |
| 23 | Fluosulfonic Acid | 10 | 5.24 | 1 | 1 | 2 | 84–115 | 41.3 |
| 24 | 50% Phosphorus Acid | 4 | 2.09 | 1 | 1 | 2 | 94–108 | 38.1 |

From the above examples, it will be apparent that strong hydroxy acids of fluorine, phosphorus, or sulfur are effective catalysts for promoting the acylation of thiophene. While the present invention of course is not to be limited by any theory it would appear that the catalysts used herein should necessarily contain at least one hydroxy group in their structure and in addition one or more of the elements fluorine, phosphorus, or sulfur. Thus, hydroxy containing acids such as boric and picric acids in which the above elements are absent were not found to exert any catalytic action in promoting the acylation reaction. Likewise, strong acids containing no hydroxy groups such as hydrochloric, hydrobromic, and hydrofluoric acids were found to be ineffective as catalysts. The details and description set forth above, however, are not to be construed as limiting the invention except as hereinafter defined by the appended claims.

We claim:

1. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and carboxylic acid anhydrides in the presence of a strong hydroxy acid characterized by an initial ionization constant greater than $1.0 \times 10^{-2}$ and containing at least one element selected from the group consisting of sulfur, phosphorus and fluorine.

2. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and carboxylic acid anhydrides in the presence of a strong hydroxy acid of phosphorus characterized by an initial ionization constant greater than $1.0 \times 10^{-2}$.

3. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and carboxylic acid anhydrides in the presence of a strong hydroxy acid of sulfur characterized by an initial ionization constant greater than $1.0 \times 10^{-2}$.

4. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and carboxylic acid anhydrides in the presence of a strong hydroxy fluorine-containing acid characterized by an initial ionization constant greater than $1.0 \times 10^{-2}$.

5. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and carboxylic acid anhydrides in the presence of orthophosphoric acid.

6. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and carboxylic acid anhydrides in the presence of sulfuric acid.

7. A process for nuclear acylation of an actylatable thiophene compound to yield a product having an acyl radical attached to the thiophene nucleus of said compound, which comprises reacting an acylatable thiophene compound with an acylating agent selected from the group consisting of acyl halides and carboxylic acid anhydrides in the presence of fluophosphoric acid monohydrate.

8. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and carboxylic acid anhydrides in the presence of from about 0.1 to about 8 per cent by weight of a strong hydroxy acid characterized by an initial ionization constant greater than $1.0 \times 10^{-2}$ and containing at least one element selected from the group consisting of sulfur, phosphorus and fluorine.

9. A process for acylation of thiophene, comprising reacting the same with an acylating agent selected from the group consisting of acyl halides and carboxylic acid anhydrides in the presence of orthophosphoric acid.

10. A process for acylation of thiophene, comprising reacting the same with an acylating agent selected from the group consisting of acyl halides and carboxylic acid anhydrides in the presence of sulfuric acid.

11. A process for acylation of thiophene, comprising reacting the same with an acylating agent selected from the group consisting of acyl halides and carboxylic acid anhydrides in the presence of fluophosphoric acid monohydrate.

12. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and carboxylic acid anhydrides at a temperature between about $-30°$ C. and about $150°$ C. in the presence of from about 0.1 to about 8 per cent by weight of a strong hydroxy acid characterized by an initial ionization constant greater than $1.0 \times 10^{-2}$ and containing at least one element selected from the group consisting of sulfur, phosphorus and fluorine.

13. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and carboxylic acid anhydrides at a temperature between about $-30°$ C. and about $150°$ C. in the presence of from about 0.1 to about 8 per cent by weight of orthophosphoric acid.

14. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and carboxylic acid anhydrides at a temperature between about $-30°$ C. and about 150° C. in the presence of from about 0.1 to about 8 per cent by weight of sulfuric acid.

15. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and carboxylic acid anhydrides at a temperature between about $-30°$ C. and about 150° C. in the presence of from about 0.1 to about 8 per cent by weight of fluophosphoric acid monohydrate.

16. A process for acylating thiophene with an acylating agent from the group consisting of acyl halides and carboxylic acid anhydrides in the presence of from about 0.1 to about 8 per cent by weight of a strong hydroxy acid characterized by an initial ionization constant greater than $1.0 \times 10^{-2}$ and containing an element from the group consisting of sulfur, phosphorus, and fluorine, comprising the steps of reacting a mixture of said thiophene, acylating agent, and acid at a temperature between about $-30°$ C. and about 150° C. for a period of from about 1 to about 10 hours, neutralizing the acidic product, washing and distilling to yield an acylated thiophene.

17. A process for acylating thiophene with an acylating agent from the group consisting of acyl halides and carboxylic acid anhydrides in the presence of a strong hydroxy acid of phosphorus characterized by an initial ionization constant greater than $1.0 \times 10^{-2}$, comprising the steps of reacting a mixture of said thiophene, acylating agent, and acid at a temperature between about $-30°$ C. and about 150° C. for a period of from about 1 to about 10 hours, neutralizing the acidic product, washing and distilling to yield an acylated thiophene.

18. A process for acylating thiophene with an acylating agent from the group consisting of acyl halides and carboxylic acid anhydrides in the presence of a strong hydroxy acid of sulfur characterized by an initial ionization constant greater than $1.0 \times 10^{-2}$, comprising the steps of reacting a mixture of said thiophene, acylating agent, and acid at a temperature between about $-30°$ C. and about 150° C. for a period of from about 1 to about 10 hours, neutralizing the acidic product, washing and distilling to yield an acylated thiophene.

19. A process for acylating thiophene with an acylating agent from the group consisting of acyl halides and carboxylic acid anhydrides in the presence of a strong hydroxy acid of fluorine characterized by an initial ionization constant greater than $1.0 \times 10^{-2}$, comprising the steps of reacting a mixture of said thiophene, acylating agent, and acid at a temperature between about $-30°$ C. and about 150° C. for a period of from about 1 to about 10 hours, neutralizing the acidic product, washing and distilling to yield an acylated thiophene.

20. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and carboxylic acid anhydrides in the presence of from about 0.1 to about 8 per cent by weight of a strong hydroxy acid characterized by an initial ionization constant greater than $1.0 \times 10^{-2}$ and containing at least one element selected from the group consisting of sulfur, phosphorus and fluorine by adding said acid to a hot solution of said acylating agent and thiophene compound, reacting the resulting mixture at a temperature between about $-30°$ C. and about 150° C. for a period of from 1 to 10 hours, neutralizing the acidic product, washing and distilling to give an acylated thiophene.

ALVIN I. KOSAK.
HOWARD D. HARTOUGH.

REFERENCES CITED

The following references are of record in the file of this patent:

Berkman, Catalysis, page 658. Reinhold Pub. Co. 1940. Ann. 424, 1(1921).

Karrer "Organic Chemistry," page 198, Nordeman Pub. Co., N. Y., 1938.